July 12, 1927.

M. ISGUERRA 1,635,849

BICYCLE WHEEL

Original Filed Dec. 27, 1924

INVENTOR
Martin Isguerra
BY
ATTORNEY

Patented July 12, 1927.

1,635,849

UNITED STATES PATENT OFFICE.

MARTIN ISGUERRA, OF KANOPOLIS, KANSAS.

BICYCLE WHEEL.

Application filed December 27, 1924, Serial No. 758,328. Renewed April 21, 1927.

This invention relates to wheels for bicycles, the invention having more particular reference to the means for attaching the wire spokes to the rim of the wheel.

The invention has for an object the provision of a novel attachment means for the spokes that does not weaken the rim, and which acts also to ensure against loosening of the spokes.

For further comprehension of the invention, and of the objects and advantages thereof, reference will be had to the following description and accompanying drawing, and to the appended claims in which the various novel features of the invention are more particularly set forth.

Fig. 1 of the drawing is a face view of a bicycle wheel having the invention applied thereto.

Figure 1:
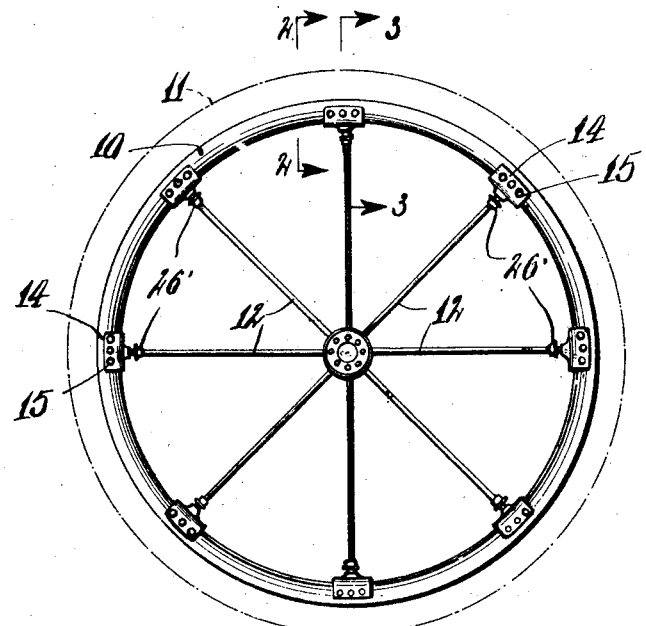
Figure 2:
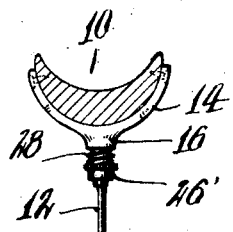
Fig. 2 is a detail transverse sectional view taken on the line 2—2 of Fig. 1.
Figure 3:
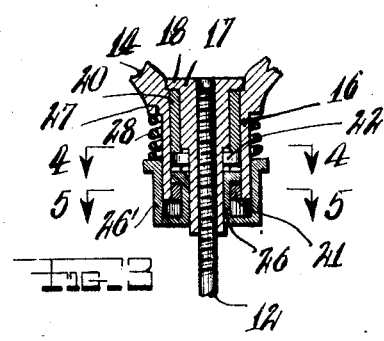
Fig. 3 is an enlarged fragmentary transverse sectional view taken on the line 3—3 of Fig. 1.
Figure 4:
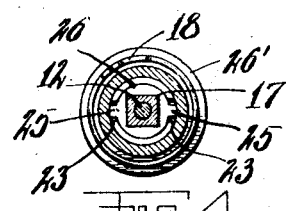
Fig. 4 is a horizontal sectional view taken on the line 4—4 of Fig. 3.

In the drawing the usual wooden rim of a bicycle wheel is shown at 10, the tire being indicated at 11. The spokes 12 are of usual wire construction and are attached to the hub of the wheel in the usual manner. To attach the spokes to the rim I provide a series of brackets 14 that are of saddle shape to fit over the inner wall of the rim, and are secured to the latter by means of the screws 15 that are passed through the bracket and into the sides of the rim.

Each bracket has formed thereon, midway between the side edges thereof, a hollow boss 16 that projects inward, that is radially of the wheel. In this boss a sleeve 17 is fitted for free rotation, the sleeve being interiorly threaded to constitute a nut and having the threaded outer end on the spoke 12 engaged therein. At its outer end this sleeve is formed with a lateral flange 18 that engages in a recess in the concave side of the bracket 14 to prevent outward displacement of the sleeve. Between the sleeve and the wall of the boss a pair of bushings 20 and 21 are positioned which are forced fits in the bore of the boss forming substantially an integral part with the boss, while forming a sliding fit on the said sleeve 17, and collar 26. These bushings are longitudinally spaced from one another to leave an annular groove or space 22 therebetween. The inner bushing 21 is formed in its outer end with a pair of notches 23, it being understood that the outer end referred to means the end remote from the hub of the wheel.

Figure 5:
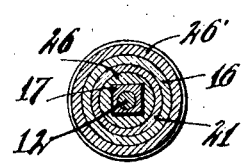
Fig. 5 is a like view to Fig. 4 but taken on the line 5—5 of Fig. 3.

These notches receive the lugs 25 formed on one end of a collar 26 that freely encircles the diminished inner end of the sleeve and projects into the boss 16 the sleeve and bore of the collar being squared as shown in Fig. 5 to prevent relative rotation of these parts. The collar is formed with an integral outer cylindrical flange 26' that engages over the inner end of the boss 16. Surrounding the boss and bearing between a shoulder 27 on the latter and the cylindrical element 26', is a coiled expansion spring 28 that acts to keep the lugs 25 engaged in the notches 23, and thereby prevent rotation of the sleeve 17. When the spoke requires adjusting the collar 26 is pushed outward to bring the lugs 25 into registry with the annular groove or space 22 between the bushings 20 and 21 and the collar is then rotated, the sleeve rotating with it, and causing the spoke to be tightened or loosened.

Having thus described my invention, what I claim as new and desire to protect by Letters Patent of the United States is as follows:—

1. In a bicycle wheel, a rim, a bracket attached to said rim and presenting a hollow boss, an internally screw threaded sleeve rotatable in said boss, a spoke having a screw threaded end engaging in said sleeve, and removable means locking said sleeve against rotation in said boss.

2. In a bicycle wheel, a rim, a bracket attached to said rim and presenting a hollow boss, an internally screw threaded sleeve rotatable in said boss, a spoke having a screw threaded end engaging in said sleeve, and removable means locking said sleeve against rotation in said boss, said means comprising a collar slidable on said sleeve and held against rotation with respect to said sleeve, and interlocking elements on said collar and boss adapted to be moved into and out of operative position by longitudinal movement of said collar on said sleeve.

3. In a bicycle wheel, a rim, a bracket attached to said rim and presenting a hollow boss, an internally screw threaded sleeve rotatable in said boss, a spoke having a screw threaded end engaging in said sleeve, and removable means locking said sleeve against rotation in said boss, said means comprising a collar slidable on said sleeve and held against rotation with respect to said sleeve, and interlocking elements on said collar and boss adapted to be moved into and out of operative position by longitudinal movement of said collar on said sleeve, and a spring engaged with said collar and acting to retain the said interlocking elements in operative position.

4. In a bicycle, a rim, a bracket attached to said rim and presenting a hollow boss, an internally screw threaded sleeve rotatable in said boss, a spoke having a screw threaded end engaging in said sleeve, said sleeve being formed to present a notch and an annular groove adjacent said notch in the wall of its bore, a collar slidable on said sleeve and held against rotation with respect to said sleeve, a lug projecting from said collar and normally engaging in said notch, and a spring bearing on said collar to retain the latter in position with the said lug engaged in the said notch.

In testimony whereof I have affixed my signature.

MARTIN ISGUERRA.